L. EGEBERG & H. EGEBERG.
Improvement in Brake Lock for Wagons.
No. 124,941. Patented March 26, 1872.

Witnesses:
A. Bennewendorf
Geo. W. Mabee

Inventor:
L. Egeberg
H. Egeberg
PER
Attorneys.

No. 124,941

UNITED STATES PATENT OFFICE.

LAWRANCE EGEBERG AND HENRY EGEBERG, OF COLUMBUS CITY, IOWA.

IMPROVEMENT IN BRAKE-LOCKS FOR WAGONS.

Specification forming part of Letters Patent No. 124,941, dated March 26, 1872.

Specification describing a new and Improved Brake-Lock for Wagons, invented by LAWRANCE EGEBERG and HENRY EGEBERG, of Columbus City, in the county of Louisa and State of Iowa.

Figure 1:
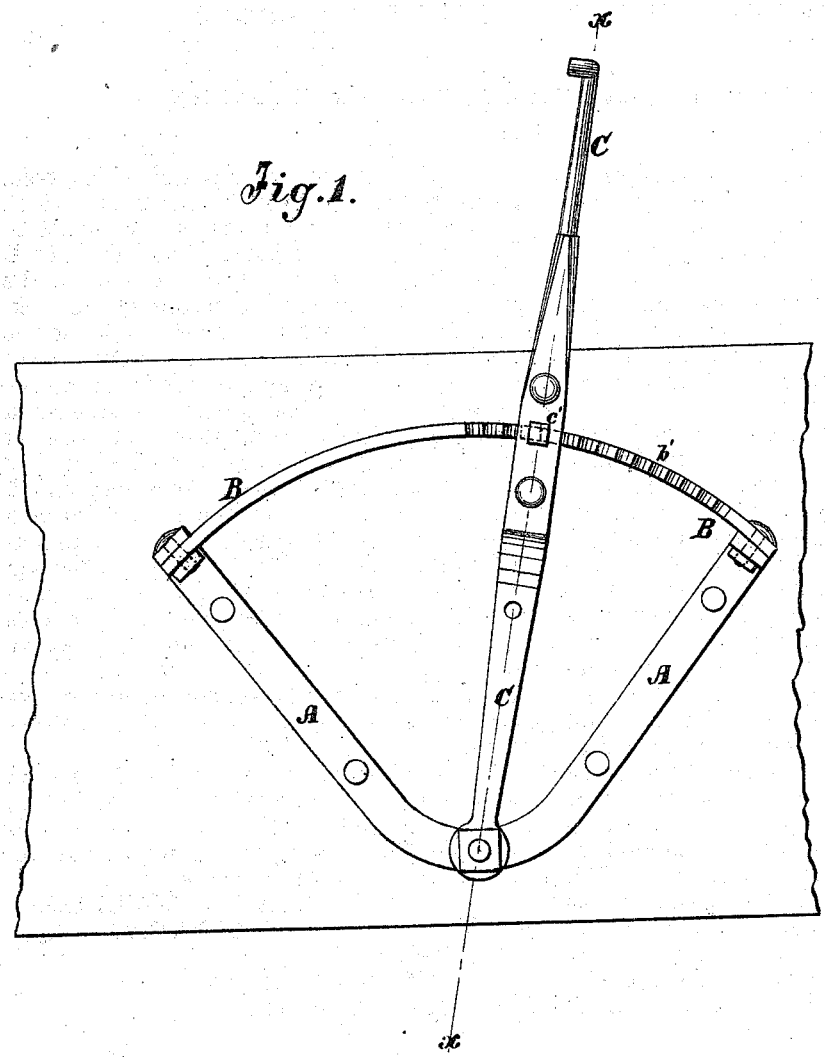
Figure 2:
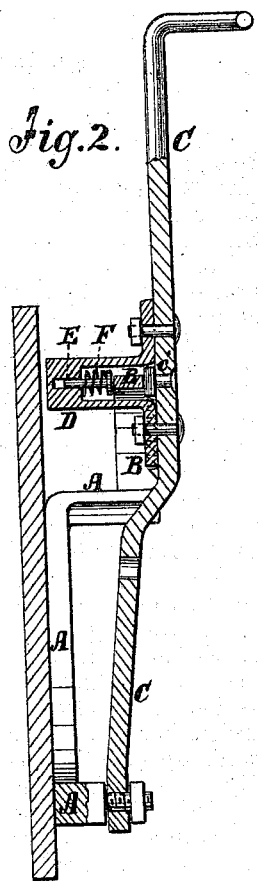

Figure 1 is a side view of our improved brake-lock. Fig. 2 is a detail sectional view of the same taken through the line $x\,x$, Fig. 1.

Similar letters of reference indicate corresponding parts.

Our invention has for its object to furnish an improved lock for wagon-brakes, which shall be simple in construction, convenient in use, and effective in operation, holding the brake securely locked when applied, and preventing rattling when the brake is not applied; and it consists in the construction and combination of the various parts of the device, as hereinafter more fully described.

A represents a bar of wrought-iron bent into V-shape and secured to the wagon-box. The ends of the bar A are bent outward, and to them are bolted the ends of a curved or arched bar, B, the forward edge of which has ratchet-teeth $b'$ formed upon it, as shown in Fig. 1. C is the lever by which the brake is applied, the lower end of which is pivoted to the middle part or angle of the bar A. The lever C is made with a band or off-set, so that it may cross the outer edge of the bar B. D is a socket, through a slot in the forward part of which the bar B passes, and the forward end of which is securely bolted to the lever C. E is a guide-pin, the head-pin of which rests against the rear edge of the bar B, and which enters a hole in the bottom of the socket D. F is a coiled spring placed upon the pin E within the socket D. The rear end of the spring F rests against the bottom of the socket D, and its forward end rests against the head of the pin E, so as to force the said head of the pin E forward against the inner edge of the bar B with sufficient force to hold the catch of the lever C securely against the teeth $b'$ of the bar B when the brake is applied, and to prevent rattling when the brake is not applied. The inner side of the lever C may be so formed as to catch upon the teeth $b'$ of the ratchet-bar B, or a separate catch, $c'$, may be attached to said lever, as shown in Figs. 1 and 2. The latter construction is preferred, as it enables the catch $c'$ to be replaced should it become worn.

Having thus described our invention, we claim as new and desire to secure by Letters Patent—

The combination of the bent bar A, toothed and curved bar B, pivoted lever C, socket D, guide-pin E, and coiled spring F with each other, substantially as herein shown and described, and for the purpose set forth.

LAWRANCE EGEBERG.
HENRY EGEBERG.

Witnesses:
WESLEY W. GARNER,
JOSHUA S. MURRAY.